United States Patent

Agrawala et al.

[15] 3,689,903

[45] Sept. 5, 1972

[54] VOLTAGE CONTROLLED OSCILLATOR WITH CONSTRAINED PERIOD OF FREQUENCY CHANGE

[72] Inventors: Ashok K. Agrawala, St. Paul, Minn.; Samuel J. Dixon, Holliston; George H. Sollman, Cambridge, both of Mass.

[73] Assignee: Honeywell Inc., Minneapolis, Minn.

[22] Filed: Oct. 16, 1970

[21] Appl. No.: 81,306

[52] U.S. Cl. ..............................340/174.1 H, 331/17

[51] Int. Cl. ..............................................G11b 5/44

[58] Field of Search..340/174.1 A, 174.1 B, 174.1 H; 331/17

[56] References Cited

UNITED STATES PATENTS 3,493,868 2/1970 Hackett, Jr. .........340/174.1 H 3,560,947 2/1971 Franchini............340/174.1 H 3,508,228 4/1970 Bishop................340/174.1 H

*Primary Examiner*—Vincent P. Canney

*Attorney*—Fred Jacob and Ronald Reiling

[57] ABSTRACT

A voltage controlled oscillator output frequency is constrained to follow the highest component of significant transitions in an input signal by allowing the input signal to change oscillator-controlling voltages only within a predetermined period after receipt of an input signal transition. The output frequency is maintained at its last corrected value between periods of change. The oscillator forms part of a phase lock loop for establishing a clock to recover variable frequency recorded information.

13 Claims, 6 Drawing Figures

INVENTORS
ASHOK K. AGRAWALA
SAMUEL J. DIXON
GEORGE H. SOLLMAN
BY
Leo Stanger
ATTORNEY

INVENTORS
ASHOK K. AGRAWALA
SAMUEL J. DIXON
GEORGE H. SOLLMAN

BY Leo Stanger
ATTORNEY

VOLTAGE CONTROLLED OSCILLATOR WITH CONSTRAINED PERIOD OF FREQUENCY CHANGE

BACKGROUND OF THE INVENTION

This invention relates to voltage controlled oscillators. More specifically, the invention relates to phase lock loops capable of clock signal generation for the recovery of three frequency, NRZ, or N+1 magnetic recorded binary information.

The use of phase lock loops in tracking systems, communication systems, and for the recovery of magnetic recorded binary data is well known. In such a phase lock loop, a voltage controlled oscillator produces an output voltage whose frequency depends upon a voltage established by a low pass filter in response to a phase comparator. The latter compares the phase of the oscillator's output voltage to the phase of each significant transition in an input signal. When such a phase difference exists, the voltage applied to the filter forces the oscillator into synchronism with the input signal. In the magnetic recording field, prior art self clocking magnetic recording systems were characterized by having a magnetic flux reversal in each bit cell established on a recording medium. For example, two frequency recording is characterized as having a synchronizing flux transition recorded at the boundary between individual bit cells. In the recording technique known as phase encoding, there is a flux transition in the center of each bit cell. These flux transitions, because they are periodic, can lock a phase lock loop into synchronism so that the loop produces clock pulses that are synchronized with the flux transitions despite speed variations in the movement of the recording medium. Thus, with recording having a transition during each bit cell, it is possible to generate a self clocking signal which allows the recovery of the recorded information.

However, in the magnetic recording techniques known as three frequency, NRZ, and N+1 recording, a transition need not necessarily occur at least once per information bit recorded. In three frequency recording, transitions may occur not only at a one bit cell interval but also at a 1½ bit cell interval or even at a two bit cell interval depending upon the recorded binary data pattern. In NRZ (Non Return to Zero) recording, flux transitions only occur when the binary value of the data changes. N+1 recording uses a NRZ format with a synchronizing flux reversal after N bits of data. Nevertheless, for these and all similar recording systems, a clock signal which will occur once per information bit must still be provided for data recovery.

It is an object of the invention to provide an improved recovery system.

It is also an object of the invention to provide an improved voltage controlled oscillator control system.

It is another object of the invention to provide an improved phase lock loop.

It is yet another object of the invention to provide a phase lock loop for synchronizing an output signal to an input signal having the form of a pulse train with missing pulses.

It is a further object of the invention to provide a phase lock loop especially suitable for recovery of three frequency, NRZ, or N+1 magnetic recorded binary information.

SUMMARY OF THE INVENTION

According to a feature of the invention, these objects are realized in a voltage controlled oscillator control system that responds to significant transitions in an input signal by permitting a low pass filter driving the voltage controlled oscillator to change its output signal in response to a phase error indicative signal from the phase comparator only during a predetermined period after each transition.

According to another feature of the invention, the low pass filter includes means to maintain its output voltage between the predetermined periods so as to constrain the oscillator to maintain its output frequency between the predetermined periods.

According to still another feature of the invention, gate means inhibit the filter between the periods and actuate the filter during the periods.

According to yet another feature of the invention, the circuit means responsive to the significant transitions of the input signal actuate the gate means.

According to still another feature of the invention, the phase lock loop forms a clock signal source for a signal recovery system.

These and other features of the invention are pointed out in the claims. Many objects and advantages of the invention will become obvious from the following detailed description when read in light of the accompanying drawings.

DETAILED DESCRIPTION OF THE PREFERRED EMBODIMENT

Figure 1:
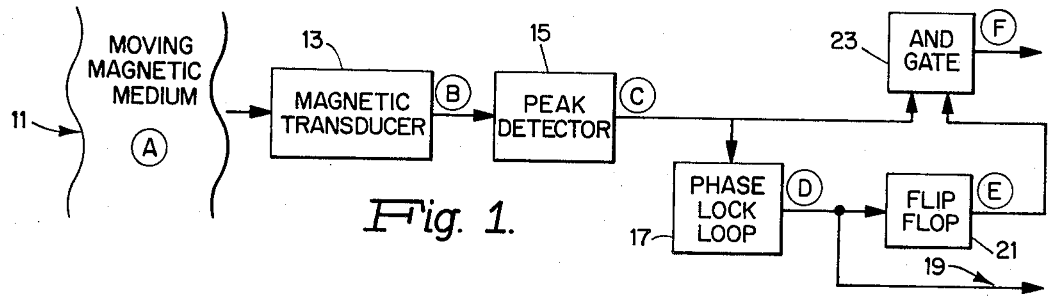
FIG. 1 is a block diagram of a magnetic signal recovery system employing a phase lock loop and embodying features of the invention.

In the magnetic recording system of FIG. 1, a moving magnetic medium 11 may be magnetic tape or a rotating magnetic disk. Recorded on the moving magnetic medium 11 is a magnetic flux polarization of the type as shown by Recorded Data waveform A in FIG. 2. As may be inferred from the Binary Data configuration of FIG. 2, Recorded Data waveform A is exemplary of a recording technique known as three frequency recording. Three frequency recording is a recording scheme in which magnetic flux reversals are placed in the center of binary bit cells containing a ONE value of binary data and flux reversals are placed between binary bit cells containing ZERO values of binary data.

The flux transitions recorded on moving magnetic medium 11 are sensed by a magnetic transducer head 13 which produces an output proportionally related to the rate of change of the magnetic flux waveform passing beneath the head 13. An idealized waveform from magnetic transducer head 13 is shown by the Read Signal waveform B in FIG. 2.

Figure 2:
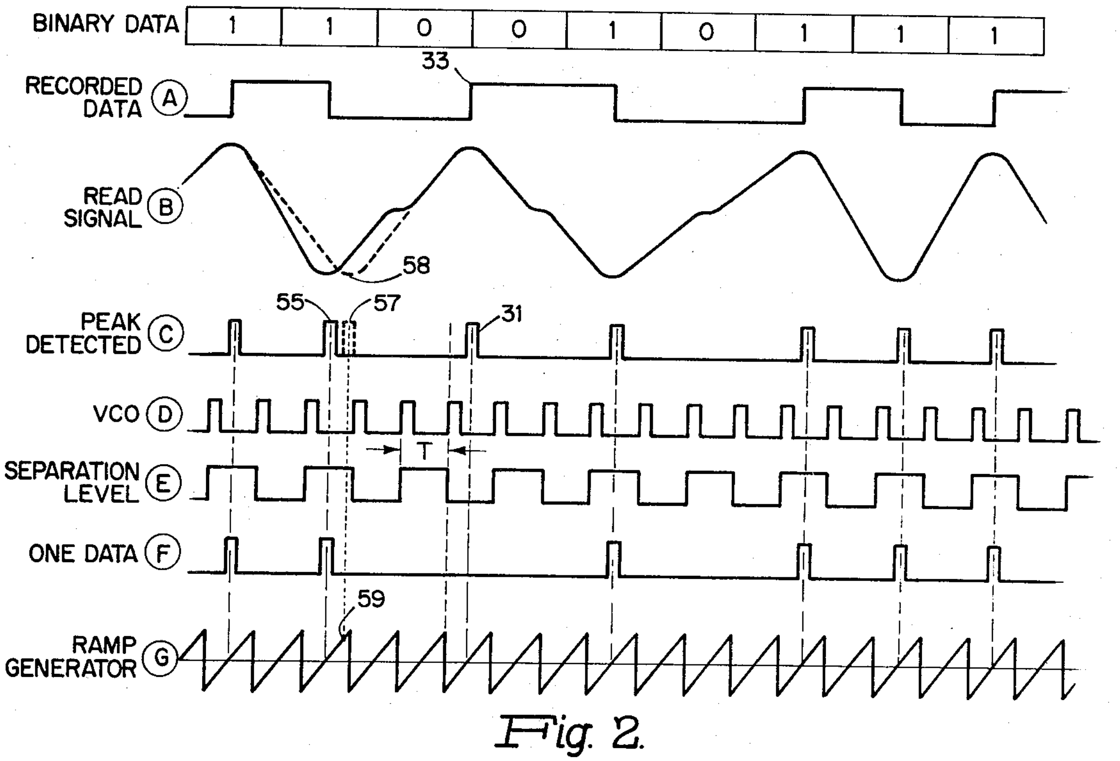
FIG. 2 is a set of waveforms representative of signals at various points in FIG. 1.

The Read Signal waveform B is applied to a peak detector 15 which produces the Peak Detected waveform C of FIG. 2. In order that peaks be indicated by pulses, peak detector 15 includes a one shot output circuit. Waveform C contains a pulse at times when the Read Signal waveform B has a maximum or minimum value. These points coincide with the transition points of Recorded Data waveform A. Peak Detected waveform C is coupled to a phase lock loop 17.

The phase lock loop 17 produces a train of clock pulses from a voltage controlled oscillator (VCO) contained herein. These pulses are shown in the VCO waveform D of FIG. 2. The pulses of VCO waveform D bracket the pulses contained in Peak Detected waveform C when the phase lock look is in or near synchronism. The VCO waveform D is provided as a source of clock signals over lead 19 for use with other segments of the recorded data recovery system (not shown) as is well-known in the art.

The VCO waveform D also actuates a flip-flop 21 to produce a binary signal as shown by the Separation Level waveform E in FIG. 2. The flip-flop 21 binarily complements its output upon receipt of a pulse from the phase lock loop 17. The spaced pulses in VCO waveform D occur twice per bit cell at positions approximately ¼ bit cell from the edges thereof. Thus Separation Level waveform E is in its ONE state for half the bit cell period and this ONE state encompasses the center of the bit cell where a data ONE indicating pulse on Peak Detected waveform C would occur.

An AND gate 23 receives the Peak Detected waveform C and the Separation Level waveform E and produces ONE Data waveform F. The AND gate 23 operates to produce a pulse output only when a pulse occurs on waveform C and waveform E is in its ONE state. Thus the pulses in ONE Data waveform F are indicative of flux reversals in Recorded Data waveform A which occurred in the middle of a bit cell and therefore represent recorded ONE value binary data. Therefore a pulse such as 31 in Peak Detected waveform C which is indicative of a flux reversal 33 occurring between adjacent binary ZERO bit cells does not appear on One Data waveform F because Separation Level waveform E is in its ZERO state during this time.

Figure 3:
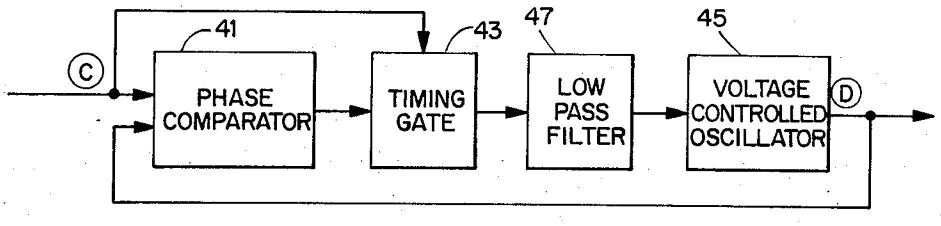
FIG. 3 is a block diagram of a voltage controlled oscillator and control system in the phase lock loop of FIG. 1.

FIG. 3 is a block diagram of the phase lock loop 17 of FIG. 1. The loop 17 received the input signal of Peak Detected waveform C and provides the output signal of VCO waveform D. Pulses on Peak Detected waveform C are provided to one input of a phase comparator 41. The second input of phase comparator 41 is connected to the VCO 45 thus receiving VCO waveform D. The output of phase comparator 41, a DC level indicative of the phase difference between pulses appearing on waveform C and waveform D, is provided to a timing gate 43. In other words, the output of phase comparator 41 indicates the phase discrepancy, both in magnitude and direction, existing between the desired phase lock condition and the actual relationship between the two waveforms C and D. A new DC level is provided at the output of phase comparator 41 whenever a pulse of Peak Detected waveform C occurs. This DC level is maintained until the occurrence of the next pulse on waveform C.

The timing gate 43, receiving the DC level from phase comparator 41, provides this DC level for a predetermined period of time to a low pass filter 47. This predetermined period is less than the time period between pulses on Peak Detected waveform C at its highest pulse repetition rate. This maximum rate, which is one-half the rate of the VCO output, occurs when the binary data comprises at least a ONE-ONE or ZERO-ZERO-ZERO pattern. Such patterns cause pulses to occur one binary bit cell apart in space which corresponds to a time period determined by the speed of moving magnetic medium 11. Other binary bit patterns cause lower rates, for example a ONE-ZERO-ZERO-ONE pattern produces pulses 1½ bit cells apart (two-thirds maximum pulse frequency and one-third the VCO frequency) and a ONE-ZERO-ONE pattern produces pulses two bit cells apart (one-half maximum pulse frequency and one-fourth the VCO frequency). However, irrespective of the instantaneous pulse rate of Peak Detected waveform C, a given DC level from phase comparator 41 is only provided to low pass filter 47 by timing gate 43 for a predetermined period of time less than the minimum period between pulses of Peak Detected waveform C. Thus the timing gate 43 operates to prevent any change in the output frequency of the VCO 45 except during a predetermined period after receipt of an input pulse indicative of a Read Signal waveform B signal peak. This frequency change prevention is accomplished by permitting the phase difference indicative signal from the phase comparator 41 to change the output of low pass filter 47 only during the predetermined period. Thereafter the filter output remains at the level at which it was most recently set. The low pass filter 47 may be only a first order integrator although any higher order function may be used. In addition to the usual advantage of having the error signal driven to zero by using a first order element such as an integrator, in a feedback system such as a phase lock loop, a first order integrator and all higher order integrators exhibit "memory". With this memory feature, after removal of an input signal from the element, the element continues to exhibit the final output value reached during application of the input signal. The output of low pas filter 47 is a correction signal coupled to VCO 45 which operates at a nominal center frequency near two pulses per bit cell when the correction signal from low pass filter 47 is zero. Since the phase difference indicative signal produced by phase comparator 41 is only applied to low pass filter 47 for a predetermined period, low pass filter 47 retains its last correction signal to voltage controlled oscillator 45 to maintain the pulses on VCO waveform D at the latest determinable correct frequency.

In the preferred embodiment, the timing gate 43, when combined with phase comparator 41, low pass filter 47 and VCO 45, enables a phase lock loop to operate in an environment where the input signal may have any instantaneous period which is approximately integrally related to the VCO output signal period. If the VCO frequency were initially 5 megapulses/second (corresponding to a period T of 200 nanoseconds) then the input signal could have any period of approximately N times 200 nanoseconds (where N is an integer) between successive signal peaks or pulses and the loop would eventually lock, with the VCO frequency assuming a value consistent with the actual input signal frequency.

Figure 4:
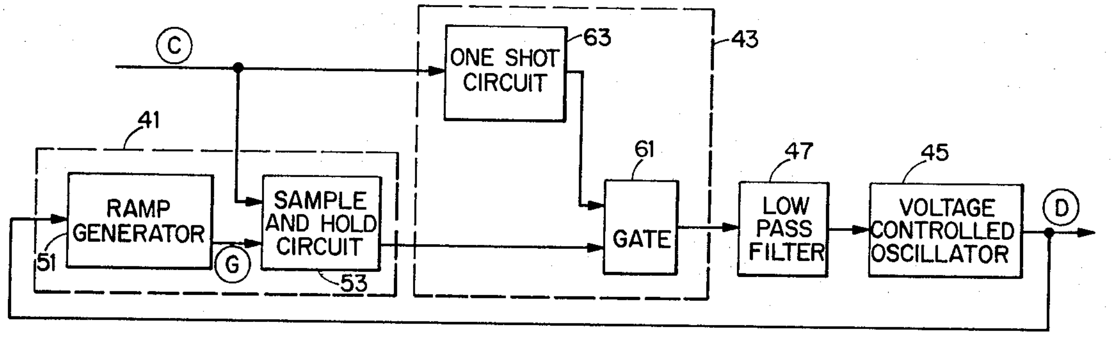
FIG. 4 is a more detailed block diagram of FIG. 3.

FIG. 4 is a more detailed block diagram of FIG. 3 in which the elements of the phase comparator 41 and the timing gate 43 are more explicitly set forth.

Phase comparator 41 is composed of a ramp generator 51 and a sample and hold circuit 53. The ramp generator 51 resets to a predetermined negative value upon receipt of a pulse from VCO 45 and thereafter produces a linearly increasing signal which passes through the zero level and becomes positive before the next pulse is received. This increasing signal is shown as Ramp Generator waveform G in FIG. 2.

The sample and hold circuit is triggered by each pulse on Peak Detected waveform C so as to sample and retain the value of Ramp Generator waveform G occurring coincident with the incoming pulse. This retained value is provided to a gate 61 until the next incoming pulse occurs causing sample and hold circuit 53 to present a new sampled value of waveform G. Thus the gate 61 is continually provided with the latest available value of the phase difference existing between the incoming pulses and the bracketing pulses of VCO waveform D.

A one shot circuit 63, which provides an enabling signal for a predetermined period of time to the gate 61, is also triggered by the incoming pulses. One shot circuit 63 is well known in the art and may be implemented in either discrete component or integrated circuit form. The gate 61 couples the output of sample and hold circuit 53 to low pass filter 47 only upon the occurrence of the enabling signal from one shot circuit 63. Thus one shot circuit 63 and gate 61 operate together to perform the function of timing gate 43 as shown in FIG. 3. Low pass filter 47 integrates, or more preferably "lags", the phase difference signal coupled through the gate 61 to produce the correction signal applied to VCO 45.

Under phase lock conditions, a pulse on Peak Detected waveform C occurs coincident with the zero crossing of Ramp Generator waveform G. If a change in frequency on waveform C or D occurs either because of electrical "drift" in the VCO 45 (waveform D) or because of changes in the speed of moving magnetic medium 11 (waveform C), then a pulse may actually occur at the relative location shown by phantom pulse 57 in waveform C instead of at the location of pulse 55. This happens because the playback signal peak on waveform B actually occurred as shown by phantom curve 58. While pulse 55 occurred at a zero crossing of Ramp Generator waveform G indicating a locked condition, phantom pulse 57 occurs at a nonzero error signal level 59. The late arrival of pulse 57 is indicative of some change, such as a change in the speed of the medium. With respect to the previous pulse (i.e. the first in waveform C), the pulse 57 produces a lower instantaneous input frequency. Thus the VCO 45 output frequency should be lowered consistent therewith. Toward this end, the error signal level 59 is retained by sample and hold circuit 53 and provided by gate 61 to low pass filter 47 for a predetermined period set by the one shot circuit 63. The low pass filter 47 which had been providing a constant correction signal to VCO 45 now integrates the error signal level 59 during the predetermined period which causes the correction signal to change value until the end of the predetermined period when the correction signal is again constant at a new value. The new constant correction signal is such as to cause the VCO 45 output frequency to decrease. If the lower input pulse frequency continues, then similar error signals (of decreasing level) are sampled from waveform G and operate to further lower the VCO 45 output frequency until the input pulses occur at the zero crossings of waveform G so that no further change in the correction signal results. If the lower input frequency does not continue, then successive pulses produce values from the waveform G that restore the original VCO output frequency.

In other words, VCO 45 produces pulses at a frequency determined by its nominal frequency setting and the correction signal applied by low pass filter 47. Each pulse from VCO 45 causes ramp generator 51 to reset to a negative value and linearly increase until the next pulse is received. An input pulse such as those of Peak Detected waveform C causes sample and hold circuit 53 to present a new output, indicative of the instantaneous value of the ramp generator 51 output when the pulse occurs, to gate 61. When the loop is properly locked, the pulses on Peak Detected waveform C will occur at the zero crossing of the Ramp Generator waveform G. The one shot circuit 63, which also receives the pulses on Peak Detected waveform C, enables gate 61 for a predetermined period to couple the sampled value of Ramp Generator waveform G to low pass filter 47. Thus VCO 45 is controlled so as to generate pulses at a rate consistent with having the pulses on Peak Detected waveform C occur at the zero crossing of Ramp Generator waveform G. Moreover, the VCO pulse rate changes only during the predetermined period after receipt of an input pulse, being constant otherwise.

Figure 5:
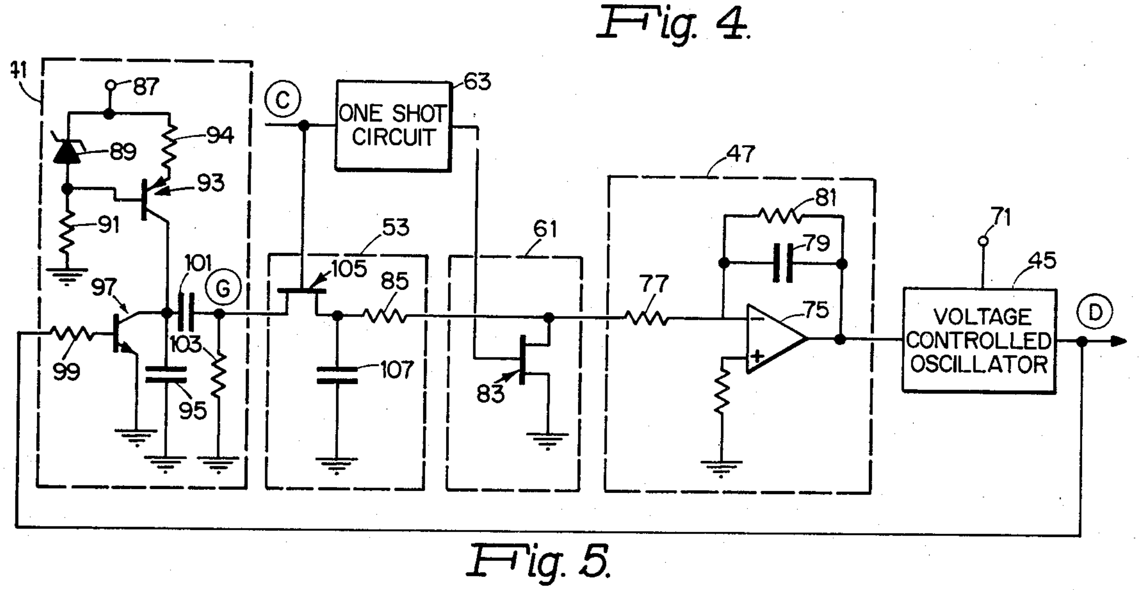
FIG. 5 is a schematic diagram of FIG. 4.

FIG. 5 is a schematic diagram of FIG. 4 in which a preferred implementation of circuit components is shown. VCO 45 is shown with terminal 71 to which a predetermined voltage is applied to establish the nominal center frequency. Voltage controlled oscillators are well-known in the art and the exact circuit design is a matter of engineering choice.

The low pass filter 47 is shown to comprise an operational amplifier 75 connected in an integrating configuration with an input resistor 77 and a feedback capacitor 79. A feedback resistor 81 causes low pass filter 47 actually to perform a first order lag function as opposed to a pure integration.

Gate 61, consisting of a field effect transistor (FET) 83, is an open or short circuit in accordance with the signal from one shot circuit 63 on the FET 83 gate terminal. When FET 83, in response to the signal on its gate terminal, is a short circuit, the ground connection on its source terminal is coupled to its drain terminal through an impedance of about 40 ohms and therefore will short out the signal which would normally pass between coupling resistor 85 and input resistor 77 if FET 83 were an open circuit.

Ramp generator 51 essentially comprises a current source charging a capacitor. To establish the current source, a predetermined positive voltage level is applied to terminal 87. A Zener diode 89 in conjunction with bias resistor 91 operates to establish a predetermined voltage drop between terminal 87 and the junction of Zener diode 89 and bias resistor 91. The junction voltage is applied to a transistor 93 on its base lead thereby establishing a substantially equal voltage on its emitter lead. Thus the predetermined voltage drop is also established across a current setting resistor 94 connected between terminal 87 and the emitter of transistor 93. Therefore, a fixed current flows through transistor 93 into an integrating capacitor 95 causing a linearly increasing voltage to appear across capacitor 95. A transistor 97, which is normally off and non-conducting is turned on by pulses from VCO 45 applied through a coupling resistor 99 to the base of transistor 97. When turned on, transistor 97 shorts out the capacitor 95 and thus causes the voltage across capacitor 95 to abruptly return to substantially zero volts. When the short duration pulse from VCO 45 is terminated, transistor 97 will again become non-conducting and allow the current from transistor 93 to charge capacitor 95 thereby creating another ramp. A by-pass capacitor 101 operates to filter out the DC component of the ramp voltage generated across capacitor 95 thereby producing the zero crossing Ramp Generator waveform G across a load resistor 103.

Sample and hold circuit 53 comprises a normally open FET 105 which becomes a short circuit upon the occurrence of a pulse from Peak Detected waveform C thereby providing the instantaneous value of Ramp Generator waveform G to a storage capacitor 107 which retains the sampled value when the short duration pulse on waveform C is terminated.

The values of the various circuit components described are chosen to establish proper impedances and time constants so that the VCO control system will operate as described. Typical values are given in the table below.

TABLE OF COMPONENT VALUES

| Reference Number | Function | Value |
|---|---|---|
| 77 | Input Resistor | 50 Kilohms |
| 79 | Integrating Capacitor | .01 Microfarads |
| 81 | Lag Resistor | 1 Megohm |
| 85 | Coupling Resistor | 50 Kilohms |
| 89 | Zener Diode | 6.2 Volts |
| 91 | Bias Resistor | 910 Ohms |
| 94 | Current Setting Resistor | 510 Ohms |
| 95 | Integrating Capacitor | 1000 Picofarads |
| 99 | Coupling Resistor | 510 Ohms |
| 101 | By-pass Capacitor | .1 Microfarads |
| 103 | Load Resistor | 100 Kilohms |
| 107 | Storage Capacitor | 1000 Picofarads |

In summary of the detailed circuit operation, a ramp generator 51 performs its function essentially by the use of Zener diode 89 and transistor 93 for establishing a predetermined current through resistor 94 to charge integrating capacitor 95 in a linear manner. Pulses from VCO 45 will briefly turn on transistor 97 thus shorting out integrating capacitor 95. By-pass capacitor 101 provides an AC coupling of the signal appearing across capacitor 95 to sample and hold circuit 53. The sample and hold circuit 53, in response to an incoming pulse, momentarily shorts FET 105 which thus provides a sampled value of Ramp Generator waveform G to storage capacitor 107. Gate 61, essentially composed of FET 83, is normally a short circuit thus preventing the voltage on shortage capacitor 107 from reaching low pass filter 47. However an incoming pulse on waveform C, through the action of one shot circuit 63, opens FET 83 for a predetermined period thus allowing the signal on capacitor 107 to reach low pass filter 47. Low pass filter 47 amplifies and integrates the voltage coupled to input resistor 77 thus producing an appropriate correction voltage for VCO 45. VCO 45, summing together the correction voltage from low pass filter 47 and the predetermined voltage level on lead 71, produces an output train of pulses in accordance therewith.

Figure 6:
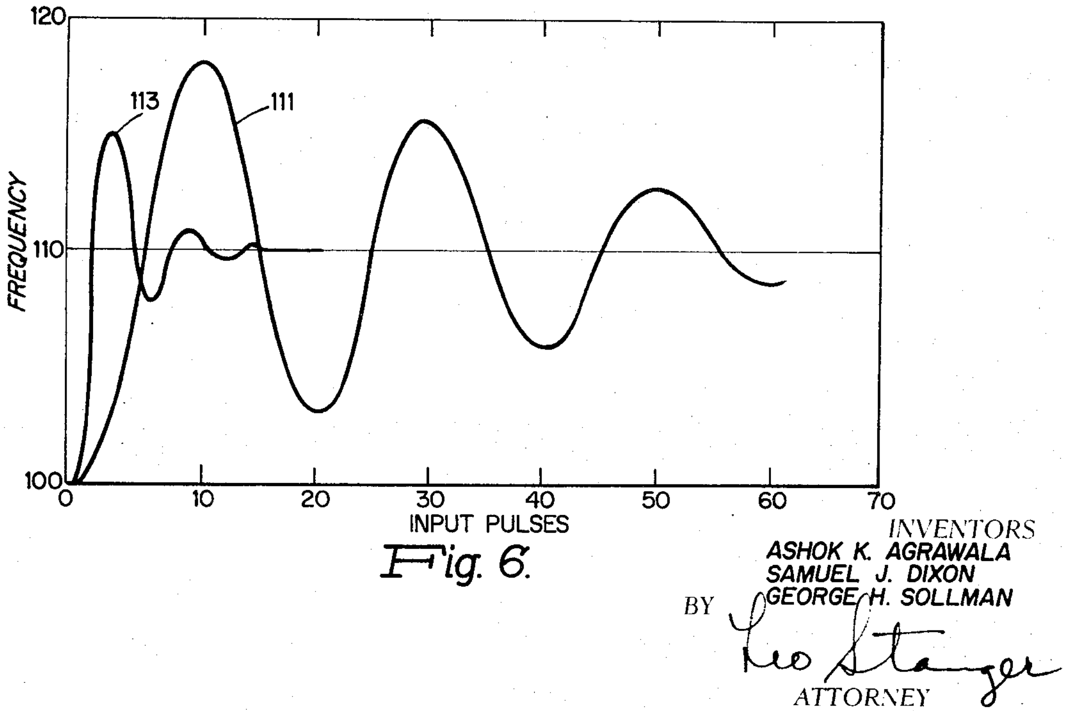
FIG. 6 shows the response of the phase lock loop for different values of gain.

A first order phase lock loop is basically a second order system from the standpoint of its input-output characteristics. For a step change in input, a second order system generally produces a damped oscillatory output which can be described in terms of natural frequency and damping factor. FIG. 6 shows the system response of the described VCO control system with two different values of gain for a step change of 10 percent in input frequency. Normalized VCO frequency on the vertical axis is plotted against the number of input pulses on the horizontal axis.

For the value of gain represented by curve 111, the system is very underdamped showing considerable overshoot and a long settling time. Even after 60 input pulses, the loop has still not locked near the new desired normalized frequency of 110. This type of performance from a clock source for recovery of recorded information in a state-of-the-art high density system would not be acceptable.

For a higher value of gain represented by curve 113, the system is slightly underdamped showing about 40 percent overshoot. However, for all practical purposes, the loop has locked after about 15 input pulses. This performance is acceptable.

Other values of gain and different low pass filter functions would produce the expected curves. A final choice of gain ordinarily depends upon the relative importance of such factors as rise time, steady state phase error, overshoot, and settling time in accord with the actual system conditions encountered in use.

Although the VCO control system has been herein described with respect to an application in a three frequency magnetic recorded data recovery system, its extension to any other system requiring a phase lock loop is readily apparent. Any periodic signal of the type herein described is capable of being reduce to a series of pulses through the use of peak or null detectors in conjunction with one shot circuits or their equivalents. Thus the invention is applicable to any system requiring a phase lock loop and is especially applicable when the input signal has, or is transformed into, the form of a pulse train with missing pulses.

Because of the VCO control system, the predetermined VCO frequency correction period is set within the phase lock loop and is thus independent of input pulse duration.

The disclosed magnetic recording recovery system provides improved recovery for two frequency and phase encoded recorded data because it is insensitive to missing synch pulses caused by bit drop-out. Thus the disclosed system produces fast initial synchronization without any special "fast acquisition" mode and without introducing errors when bit drop-out occurs.

From the foregoing discussion it will be apparent that numerous modifications, departures, substitutions, and equivalences may now occur to those skilled in the art, all of which fall into the scope and spirit of the present invention.

What is claimed is:

1. A voltage controlled oscillator control system receiving an input signal of instantaneous period approximately integrally related to a minimum period comprising:

voltage controlled oscillator means responsive to a correction signal to provide a periodic variable frequency output signal determinative of said minimum period;

phase comparator means producing an error signal representative of the phase difference between said input signal and said output signal;

low pass filter means responsive to said phase comparator means for constraining said oscillator means to adjust its frequency; and timing gate means, connected to said phase comparator means and to said low pass filter means, and responsive to the input signal to permit said filter means to constrain said oscillator means so as to change its output frequency in response to the error signal only for predetermined periods.

2. The apparatus of claim 1 wherein said phase comparator means comprises:

a ramp generator means for producing an increasing signal, said ramp generator means responsive to a predetermined number of said output signal frequency periods to reset said increasing signal to a predetermined signal level; and a sample and hold circuit means responsive to said input signal to store the instantaneous value of said increasing signal.

3. The apparatus of claim 1 wherein said timing gate means comprises:

means responsive to said input signal to generate an enabling signal of a predetermined period; and gate means responsive to said enabling signal to control said low pass filter means in accordance with said enabling signal.

4. The apparatus of claim 3 wherein said low pass filter means comprises an integrator.

5. The apparatus of claim 3 wherein said low pass filter means comprises a lag network.

6. The apparatus of claim 3 additionally comprising input signal transforming means adapted to provide a pulse in response to an input signal cycle.

7. The apparatus of claim 6 wherein said input signal transforming means comprises a one shot circuit adapted to provide a pulse in response to a relative maximum value of said input signal.

8. The apparatus of claim 6 wherein said voltage controlled oscillator means produces a pulse train.

9. A binary magnetic recording recovery system comprising:

a moving medium including a magnetizable surface having impressed thereon flux orientations indicative of recorded binary data;

a transducer means positioned in close proximity to said surface and responsive to changes in said flux orientations for producing a read signal indicative thereof;

detector means responsive to relative maxima of said read signal for producing a train of pulses; and clock signal generation means including;

voltage controlled oscillator means responsive to a correction signal for providing a clocking signal, phase comparator means for producing an error signal representative of the phase difference between said train of pulses and said clocking signal, low pass filter means responsive to an applied signal for providing said correction signal to said voltage controlled oscillator, and timing gate means, connected to said phase comparator means and to said low pass filter means, and responsive to said train of pulses and said error signal for providing said applied signal for a predetermined period of time to said low pass filter means.

10. The apparatus of claim 9 further including:

flip-flop means responsive to said clocking signal for producing a separation signal; and gate means responsive to said train of pulses and said separation signal for producing a ONE data signal.

11. The magnetic recording recovery system of claim 9 wherein said timing gate means comprises:

means responsive to the pulses within said train of pulses for generating an enabling signal of a predetermined period; and gate means responsive to said enabling signal for gating said error signal in accordance with said enabling signal.

12. A phase lock loop having a periodic output signal of period T and an input signal of variable periods approximately equal to NT where N is a changing integer, comprising:

phase comparator means for comparing the difference between the actual period of said input signal and NT to produce an error signal indicative thereof;

timing gate means connected to said phase comparator means and responsive to said input signal of variable periods for providing a gated error signal for a predetermined period of time;

low pass filter means, connected to said timing gate means and responsive to the gated error signal from said timing gate means, for producing a control signal; and voltage controlled oscillator means for generating said periodic output signal in response to said control signal so as to vary the period T of the periodic output signal.

13. The magnetic recording recovery system of claim 12 wherein said timing gate means comprises:

means responsive to the pulses within said train of pulses for generating an enabling signal of a predetermined period; and gate means responsive to said enabling signal for gating said error signal in accordance with said enabling signal.

* * * * *